(12) United States Patent
Matoba et al.

(10) Patent No.: US 7,022,996 B2
(45) Date of Patent: Apr. 4, 2006

(54) RADIATION DETECTOR

(75) Inventors: Yoshiki Matoba, Chiba (JP); Kazuhiko Kimura, Chiba (JP)

(73) Assignee: SII NanoTechnology Inc., Tokyo (JP)

( * ) Notice: Subject to any disclaimer, the term of this patent is extended or adjusted under 35 U.S.C. 154(b) by 161 days.

(21) Appl. No.: 10/443,225

(22) Filed: May 22, 2003

(65) Prior Publication Data
US 2003/0218134 A1 Nov. 27, 2003

(30) Foreign Application Priority Data
May 24, 2002 (JP) ............................. 2002-150563

(51) Int. Cl.
*G01T 1/24* (2006.01)

(52) U.S. Cl. .................................. 250/370.13
(58) Field of Classification Search ........... 250/370.06, 250/370.13
See application file for complete search history.

(56) References Cited

U.S. PATENT DOCUMENTS 5,306,915 A * 4/1994 Matthews .............. 250/370.13
6,350,989 B1 * 2/2002 Lee et al. .............. 250/370.01

FOREIGN PATENT DOCUMENTS

JP 403194364 A * 8/1991 ...................... 62/6

* cited by examiner

*Primary Examiner*—David Porta
*Assistant Examiner*—Mindy Vu
(74) *Attorney, Agent, or Firm*—Adams & Wilks

(57) ABSTRACT

In order to provide a radiation detector capable of implementing measurements with a good energy resolution and a high detection efficiency over a broad energy range using a single detector, in the present invention, a radiation detecting element composed of Si semiconductor and the radiation detecting element composed of CdZnTe or CdTe semiconductor are lined up as two layers longitudinally. The radiation detecting element composed of Si semiconductor is taken as a first layer at the side of incidence of the radiation and the radiation detecting element composed of CdZnTe or CdTe semiconductor is taken as a second layer.

4 Claims, 1 Drawing Sheet

RADIATION DETECTOR

BACKGROUND OF THE INVENTION

1. Field of the Invention

The present invention relates to an energy dispersive X-ray detector for use in an energy dispersive X-ray analyzer or an X-ray fluorescence thickness gauge, etc.

2. Description of Related Art

Detectors such as proportional counters, cooled Si-PIN diode detection elements and Si(Li) detection elements are used in energy dispersive X-ray analyzers and X-ray fluorescence thickness gauges of the related art.

Further, semiconductor radiation detection elements employing Ge semiconductor radiation detection elements or compound semiconductors such as CdTe or CdZn etc. are also employed with comparatively high-energy X-rays or high-energy radiation detection.

The proportional counter is one form of a gas-filled detector and one important application is detecting and performing spectral measurements for relatively low energy X-rays. For example, with a proportional counter employing Xe gas, the absorption efficiency with respect to incident X-rays is extremely high up to approximately 10 keV and the absorption rate is lower with respect to high-energy X-rays of greater than 10 keV but an effective response levels off at approximately 100 keV. Further, the resolution of the MnKα lines (5.9 keV) is approximately 10%. Proportional counters are therefore utilized in X-ray fluorescence thickness gauges because of the broadness of the detectable energy range, appropriateness of the resolution, and good detection efficiency.

Si-PIN diode detectors use ion injection methods and optical lithographic methods as a manufacturing method. Surface leakage current that causes resolution to deteriorate can therefore be made small because it is easy for deactivation due to oxidation to take place. Si-PIN diode detectors are possible to detect approximately 200 eV at the half-width of the MnKα line (5.9 keV) using a Peltier element etc. cooled to minus a few tens of degrees centigrade. The detection efficiency for X-rays of approximately 20 keV or more is therefore extremely poor because an i-layer, which is sensitive layer, cannot be made thick due to limitations with respect to purity of the Si semiconductor. However, because a large scale cooling system such as a liquid nitrogen cooling system etc. is not required and size of the detector itself is small, these are utilized in small-type X-ray fluorescence analyzers such as portable X-ray fluorescence analyzers.

Si(Li) detection elements are one type of p-i-n type structure detection elements composed of Si semiconductor and have the feature that sensitive layers a few millimeters thick are obtained by Li drift in p-type Si semiconductor. Detection efficiency is therefore even high for high-energy X-rays. It is also possible to realize approximately 130 eV at the half-width of the MnKα line (5.9 keV). However, in order to operate at a high level, it is necessary to provide cooling to approximately −100 degrees centigrade using liquid nitrogen or a pulse-tube freezer, etc.

Detection elements utilizing compound semiconductors such as CdTe or CdZnTe used as high energy radiation detectors having high radiation absorption capabilities have a sufficiently large band gap and can therefore operate at normal temperatures. However, the band gaps of these semiconductors are large compared to that of Si. The resolution obtained using the Peltier element even when cooling down to a few tens of degrees centigrade is therefore approximately 400 eV at the half-width of the MnKα line (5.9 keV).

The following three items are the main requirements regarding performance of radiation detectors used in energy dispersive X-ray fluorescence analyzer devices or film thickness gauges.

(1) Good energy resolution constituted by the ability to separate and identify fluorescent X-rays of neighboring energies.

(2) High detection efficiency with respect to a broad energy range of radiation.

(3) Straight forward maintenance.

Of the four types of detectors given in the related art, detectors employing Si(Li) semiconductors are radiation detectors capable of responding to the performance requirements described in (1) and (2). However, these require cooling systems such as liquid nitrogen systems which are difficult to maintain. In the case of a proportional counter and CdTe or CdZnTe, the cooling system can be simplified and detection efficiency with respect to high energies is high, but resolution is inferior. The cooling system can also be simplified for Si-PIN diode detectors and a certain degree of resolution can be attained, but with this configuration the detection efficiency is low for high-energy radiation.

As described above, when the four types of detector are used independently, it is difficult to fulfill all of the requirements. Devices have therefore employed one type of detector in line with the application up until this time.

SUMMARY OF THE INVENTION

The present invention provides a radiation detector capable of implementing measurements with a good energy resolution with a high detection efficiency over a broad energy range using a single detector.

A radiation detector of the present invention comprises a first radiation detection element composed of Si semiconductor for obtaining resolution and a second radiation detection element composed of CdZnTe or CdTe semiconductor for absorbing high energy radiation. The first radiation detection element and the second radiation detection element overlap with each other in such a manner that the first radiation detection element is on the side of incidence of the radiation. The radiation detection element for obtaining high resolution is taken as a first layer on the side of the incidence of the radiation, and the second radiation detection element for absorbing high-energy radiation is taken as the second layer.

With the above configuration, low energy radiation is absorbed by the semiconductor of the first layer having superior resolution and the energy and amount of radiation can therefore be appropriately measured. High-energy radiation is absorbed by the second layer constituted by the semiconductor having a high detection efficiency with respect to high energy radiation without being absorbed by the first layer so that the energy and number are measured.

It is therefore possible to provide a radiation detector capable of implementing measurements with a good energy resolution with a high detection efficiency over a broad energy range using a single radiation detector.

DETAILED DESCRIPTION OF THE INVENTION

A description will now be given in the following with reference to the drawings of an embodiment of the present invention.

Figure 1:
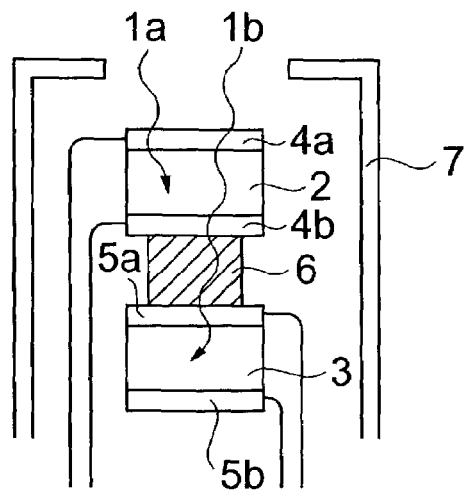
FIG. 1 is a view illustrating a radiation detector where two types of radiation detection element are overlapped.

FIG. 1 is a view of a configuration for a radiation detector of an embodiment of the present invention. In FIG. 1, numeral 1a and numeral 1b indicate radiation to be measured, with the radiation 1a being of a low energy level and radiation 1b being of a high energy level. Numeral 2 indicates a radiation detection element composed of Si semiconductor. Numeral 3 indicates a radiation detection element composed of CdZnTe or CdTe semiconductor, with the structure being such that the radiation detection element 2 is stacked on top of the radiation detection element 3 with respect to the direction of incidence of the radiation 1a and radiation 1b. Numerals 4a and 4b indicate electrodes of the radiation detection element 2 composed of Si semiconductor and signal lines connected to the electrodes, and numerals 5a and 5b indicate electrodes for the radiation detection element 3 composed of CdZnTe or CdTe semiconductor and signal lines connected to the electrodes. Numeral 6 indicates an insulating layer provided between electrodes 4b and 5a for insulating the radiation detection elements 2 and 3. Numeral 7 indicates a detector housing having an entrance window. A semiconductor having comparatively good energy resolution such as an Si-PIN diode detection element or an Si(Li) detection element etc. may be used as the radiation detection element 2 used here. The signal lines extending from the electrodes 4a, 4b, 5a and 5b of the semiconductor elements 2 and 3 are connected to signal processing circuits such as stand-alone amplifiers and pulse-height discriminators etc.

Next, a description is given of the operation. First, the radiation 1a is incident to the Si semiconductor constituting the radiation detection element 2 from a window of the detector housing 7. The energy of the radiation 1a is small at 20 keV or less. This radiation is therefore all absorbed by the Si semiconductor so as to create electrons and positive holes. A high voltage is applied to the radiation detection element 2 using the electrodes 4a and 4b provided at both ends of the radiation detection element so as to create an electric field within the element. The electrons and positive holes are then collected by the electric field so as to flow towards the electrodes. Charge is therefore induced across the ends of the electrodes 4a and 4b as a result of the electrons and positive holes flowing within the radiation detection element 2. The quantity of this charge can then be measured using a signal processing circuit (not shown) to which the extending signal lines 4a and 4b are connected. The initially generated pairs of electrons and positive holes are proportional to the radiation energy. The energy of the radiation 1a can therefore be known by measuring this amount of charge. In the case of an Si semiconductor, the energy obtained from radiation in order to create one electron-positive hole pair is extremely small at 3.5 eV, i.e. the number of positive hole-electron pairs generated from radiation of the same energy is large. The resolution of the radiation detection element 2 composed of silicon semiconductor is typically excellent at a half-width of 130 to 250 eV.

However, absorption efficiency for high-energy radiation exceeding 20 keV is low because the atomic number is small. The probability of the high-energy radiation 1b passing through the radiation detection element 2 without any mutual interaction is therefore high.

The radiation 1b passing through the radiation detection element 2 is then absorbed by the radiation detection element 3 composed of CdZnTe or CdTe semiconductor of a high atomic number and high radiation absorption efficiency and as with the Si semiconductor, positive holes and electrons are generated in proportion to the energy of the radiation, with this energy being measured by a signal processing circuit. The band gap is large for a CdZnTe or CdTe semiconductor. The energy obtained from radiation in order to generate an electron-positive hole pair is therefore large compared with an Si semiconductor at approximately 4.5 eV. The number of positive hole-electron pairs generated from radiation of the same energy is therefore comparatively small. The energy resolution is therefore inferior compared to an Si semiconductor. However, the absorption efficiency for high-energy radiation is high because the atomic number is large. Use as a second layer is therefore extremely effective.

By arranging this semiconductor with good resolution as a first layer at the side of incident radiation and arranging a semiconductor with good detection efficiency with respect to high energy radiation as a second layer, radiation 1a of low energy is absorbed by the radiation detection element 2 of good resolution so that accurate energy and numbers can be measured. The high-energy radiation 1b passes through the first layer without any kind of mutual interaction taking place but is absorbed by the second layer constituted by the radiation detection element 3 having a high detection efficiency with respect to high energy radiation so that the energy and number are measured.

Figure 2A:
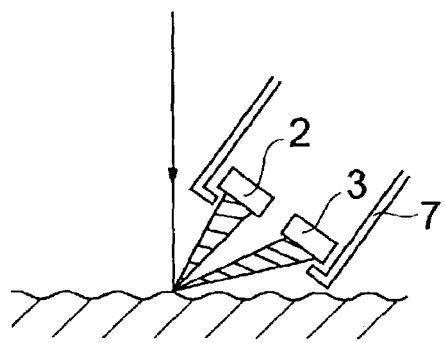
FIGS. 2A–2B are views illustrating results for a solid angle achieved by longitudinally overlapping two types of radiation detection element.
Figure 2B:
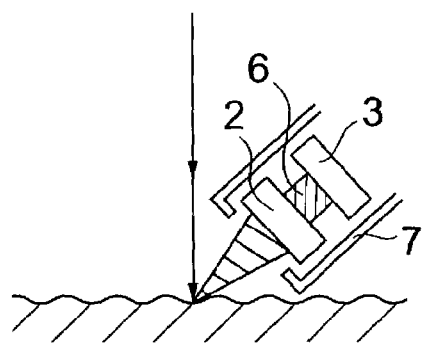

Further, by adopting a configuration as in the present invention where two detection elements are made to overlap longitudinally, it is possible to make a solid angle broadening from the sample to the detection element large. FIGS. 2A and 2B are views showing the case for when two types of radiation detection elements are lined up longitudinally and when they are lined up next to each other. As shown in FIGS. 2A–2B, it is possible to achieve a solid angle of approximately twice the size in the case of stacking up the two types of detection elements (FIG. 2B) compared with the case where two types of detection elements are line up next to each other (FIG. 2A). A large solid angle means that it is possible to make the amount of radiation detected per unit time large so that precision during quantative analysis is improved. In the present invention, because a longitudinally overlapping configuration is adopted, the same solid angle as for one type of radiation detection element can be obtained and highly precise measurement is possible.

An insulator that has low absorption of radiation such as a ceramic, silicon oxide, or silicon nitride etc. may be used as the insulator at the insulating layer 6. It is also possible to provide a hermetically sealed space inside which a vacuum is formed or the inside of which is filled with an inert gas of a low atomic number such as He or Ne etc. in place of the insulator. In this case, insulation of between the electrodes of both detection elements suppresses wasteful absorption of radiation energy between the detection elements so as to make the invention even more effective.

Figure 3:
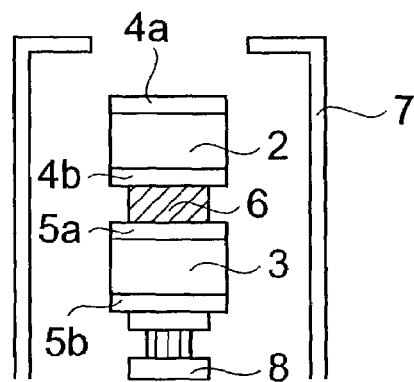
FIG. 3 is a view illustrating Peltier element cooling.

Further, in the above embodiment, an Si-PIN diode semiconductor or an Si(Li) semiconductor is used as the Si semiconductor constituting the radiation detection element 2 in this embodiment. In particular, when an Si-PIN diode semiconductor is used, sufficient performance can be obtained at cooling of −80 to 10 degrees centigrade. This can also be said for the CdZnTe or CdTe semiconductor constituting the radiation detection element 3. Maintainability is also improved because merely thermoelectric cooling such as with the kind of Peltier element 8 etc. as shown in FIG. 3 is sufficient as the means for cooling both the Si-PIN diode and the CdZnTe or CdTe semiconductor.

It is also possible to use liquid nitrogen or a pulse tube freezer etc. as the means for cooling the elements. In this case, a degree of maintainability is sacrificed in order to enable the use of Si(Li) semiconductor as the Si semiconductor so that improved energy resolution can be obtained.

According to the present invention, a radiation detector of the present invention comprises a first radiation detection element composed of Si semiconductor for obtaining resolution and a second radiation detection element composed of CdZnTe or CdTe semiconductor for absorbing high energy radiation. In particular, the first radiation detection element and the second radiation detection element overlap with each other in such a manner that the first radiation detection element is on the side of the incident radiation. It is therefore possible to realize a radiation detector with good energy resolution, and high detection efficiency over a broad energy range.

Further, when an Si-PIN diode semiconductor is used as an Si semiconductor, these cooling systems are compatible with Peltier elements etc. and maintain ability is therefore improved. Further, as a result of stacking the two detection elements vertically, compared to the case of lining up the elements next to each other, it is possible to double the size of a solid angle broadening out from the sample to the detection element and it is possible to improve accuracy during quantative measurement.

What is claimed is:

1. A radiation detector for detecting incident radiation, comprising:
   a first radiation detection element composed of Si semiconductor, the first radiation detection element comprising an Si-PIN diode detection element; and
   a second radiation detection element composed of CdZnTe or CdTe semiconductor, the second radiation detection element overlapping the first radiation detection element in such a manner that the first radiation detection element is on the side of the incident radiation.

2. A radiation detector for detecting incident radiation, comprising:
   a first radiation detection element composed of Si semiconductor, the first radiation detection element comprising an Si(Li) detection element; and
   a second radiation detection element composed of CdZnTe or CdTe semiconductor, the second radiation detection element overlapping the first radiation detection element in such a manner that the first radiation detection element is on the side of the incident radiation.

3. A radiation detector for detecting incident radiation, comprising:
   a first radiation detection element composed of Si semiconductor; and
   a second radiation detection element composed of CdZnTe or CdTe semiconductor, the second radiation detection element overlapping the first radiation detection element in such a manner that the first radiation detection element is on the side of the incident radiation;
   wherein the first radiation detection element and the second radiation detection element overlap each other via an insulating body.

4. A radiation detector for detecting incident radiation, comprising:
   a first radiation detection element composed of Si semiconductor; and
   a second radiation detection element composed of CdZnTe or CdTe semiconductor, the second radiation detection element overlapping the first radiation detection element in such a manner that the first radiation detection element is on the side of the incident radiation;
   wherein the first radiation detection element and the second radiation detection element overlap each other via an intervening vacuum or an inert gas.

* * * * *